United States Patent [19]

D'Urso et al.

[11] Patent Number: 5,353,335
[45] Date of Patent: Oct. 4, 1994

[54] MULTILINGUAL PREPAID TELEPHONE SYSTEM

[75] Inventors: Anthony D. D'Urso, Long Valley; Orlando S. King, Edison; Arthur G. Martin, Bernardsville; Christine P. Peterson, Fords; David G. Unger, Morristown, all of N.J.

[73] Assignee: AT&T Bell Laboratories, Murray Hill, N.J.

[21] Appl. No.: 923,645

[22] Filed: Aug. 3, 1992

[51] Int. Cl.$^5$ .......................................... H04M 17/00
[52] U.S. Cl. ...................................... 379/67; 379/155; 379/88; 379/143
[58] Field of Search ............... 379/155, 88, 143, 154, 379/144, 112, 114, 126, 121, 123

[56] References Cited

U.S. PATENT DOCUMENTS

| | | | |
|---|---|---|---|
| 4,224,472 | 9/1980 | Zarount | 379/123 |
| 4,706,275 | 11/1987 | Kamil | 379/144 |
| 4,813,065 | 3/1989 | Segala | 379/112 |
| 4,879,744 | 11/1989 | Tasaki | 379/144 |
| 4,935,956 | 6/1990 | Hellwarth | 379/112 |
| 5,007,077 | 4/1991 | Field | 379/67 |
| 5,014,301 | 5/1991 | Maltezos | 379/155 |
| 5,109,401 | 4/1992 | Hattori | 379/112 |
| 5,134,646 | 7/1992 | Carlson | 379/67 |

OTHER PUBLICATIONS

VIP Debit Card–You Will Find It Convenient Even You Speak In Taiwanese. Feb. 28, 1992 China Times.
VIP Debit Card–A Great Advantage for U.S./Canada Travelers.
"No Language Barriers Here," Voice Processing Magazine, Mar. 1992.
New Arrival Announcement, "VIP Debit Card."

Primary Examiner—James L. Dwyer
Assistant Examiner—Michael Lau
Attorney, Agent, or Firm—Eugene S. Indyk

[57] ABSTRACT

A prepaid telephone system having multilingual capabilities is provided in a public switched telephone network. A telephone user buys a predetermined amount of service beforehand and receives a card imprinted with a unique account number. A plurality of toll free access telephone numbers allows the user to access the prepaid telephone system. Each of those telephone numbers causes the prepaid system to interact with the user in the language in which he or she wishes the system to operate. The user is prompted in the chosen language to enter his or her card number. The authenticity of the number and the available credit is determined. If there is a certain minimum amount of credit available, the user is prompted to enter the phone number of a desired party. The user may also dial a speed dialing alias which connects the user to special services including news, weather, travel, translation, and other services. If the user has enough available credit to pay for at least a minimal amount of calling time, the call is completed. A timer is set with an amount of calling time permitted by the available balance. The timer runs during the course of the phone call and the call is disconnected when the timer runs out. If the call is ended prior to the timer running out, a new available balance is computed in light of the time remaining on the timer. The user can make additional phone calls using the new available credit balance.

34 Claims, 11 Drawing Sheets

MULTILINGUAL PREPAID TELEPHONE SYSTEM

TECHNICAL FIELD

This disclosure relates to prepaid telephone service. More particularly, this disclosure relates to prepaid telephone service with multiple language service. This service will be of great use to foreign language travelers and tourists situated in geographical areas served by telecommunication service providers with which they do not have established business relationships.

BACKGROUND

Advances in transportation technology have made people around the world increasingly mobile. Larger numbers of people now travel greater and greater distances from home. For example, there is an increasing amount of international travel in which business travelers and tourists find themselves outside of the geographical regions where their native languages are normally spoken.

In addition to moving about more freely, people are becoming increasingly reliant on telephones as a means of communicating with each other and as a means of obtaining information and other services. The telecommunications services provided by each telecommunications service provider are usually limited to certain restricted geographical areas. Convenient contractual arrangements involving billing for past services rendered are in place only for those customers usually located in the area served by each service provider. All others must normally use prepay systems such as pay telephones to obtain service. This may be inconvenient for long distance calls as a large amount of currency or a particular credit card or phone card must be available. An international traveler who is not fluent in the language of the region served by a telecommunications service provider has an additional burden in using the telephone in that instructions in his native language on how to use the telephone are normally unavailable. An international traveler also is not easily able to obtain information such as weather or news from a local telephone system in his or her own language. International travelers thus have at least two significant hurdles to overcome before a local telephone system can be effectively put to use. First, a large amount of currency or a credit card not normally available to everyone must be used to gain access to the telephone system. Second, assistance and information is available only in a language foreign to the international traveler.

There have been attempts in the past to provide prepaid telephone service said to be of use to travelers and tourists. See, for example, U.S. Pat. No. 4,706,275 issued to Kamil. These efforts fall short, however, because they do not involve multilingual capabilities of use to international travelers. They also involve rudimentary network architectures incapable of handling the high volume of call traffic on today's high capacity telephone networks. The customer verification procedures are also rudimentary, thereby making such systems subject to fraud.

There also have been efforts to develop a pay phone providing multilingual instructions to a user on how to complete a phone call. See, Maltezos U.S. Pat. No. 5,014,301 issued to Maltezos. These efforts are unsatisfactory because a specially configured pay phone must be provided and the multilingual capabilities are severely limited. This arrangement has all of the usual disadvantages of pay phones with a limited ability to provide a multilingual capability apart from merely making announcements about how to make a call.

SUMMARY

The problems outlined above are solved in one example of the invention by an apparatus and method which provides a telephone network architecture involving a special platform connected to a node in a public switched telephone network. The platform effectuates a multilingual prepaid calling service on the network. Not only is access to the usual calling services of the network easily provided without a need for a large amount of currency, but also users of this service are provided easy access to instructions in the user's native tongue on how to use the service. Additional useful information is easily obtainable via the network in the user's chosen language.

In a specific example of this invention, a telephone network is responsive to a prepaid user dialing a toll-free 800 telephone number which accesses a multilingual prepaid calling system in the network. There are a plurality of possible 800 numbers each of which connects a series of instructional announcements in a particular language to the user depending upon the 800 number chosen by the user. The user selects the language of the announcements by an appropriate selection of 800 number. The announcements instruct the user to enter appropriate codes to obtain access to the calling capability of the telephone network. A series of speed dialing aliases are provided to permit the user to obtain information from the telephone network in the language selected by the user.

DETAILED DESCRIPTION

Figure 1:
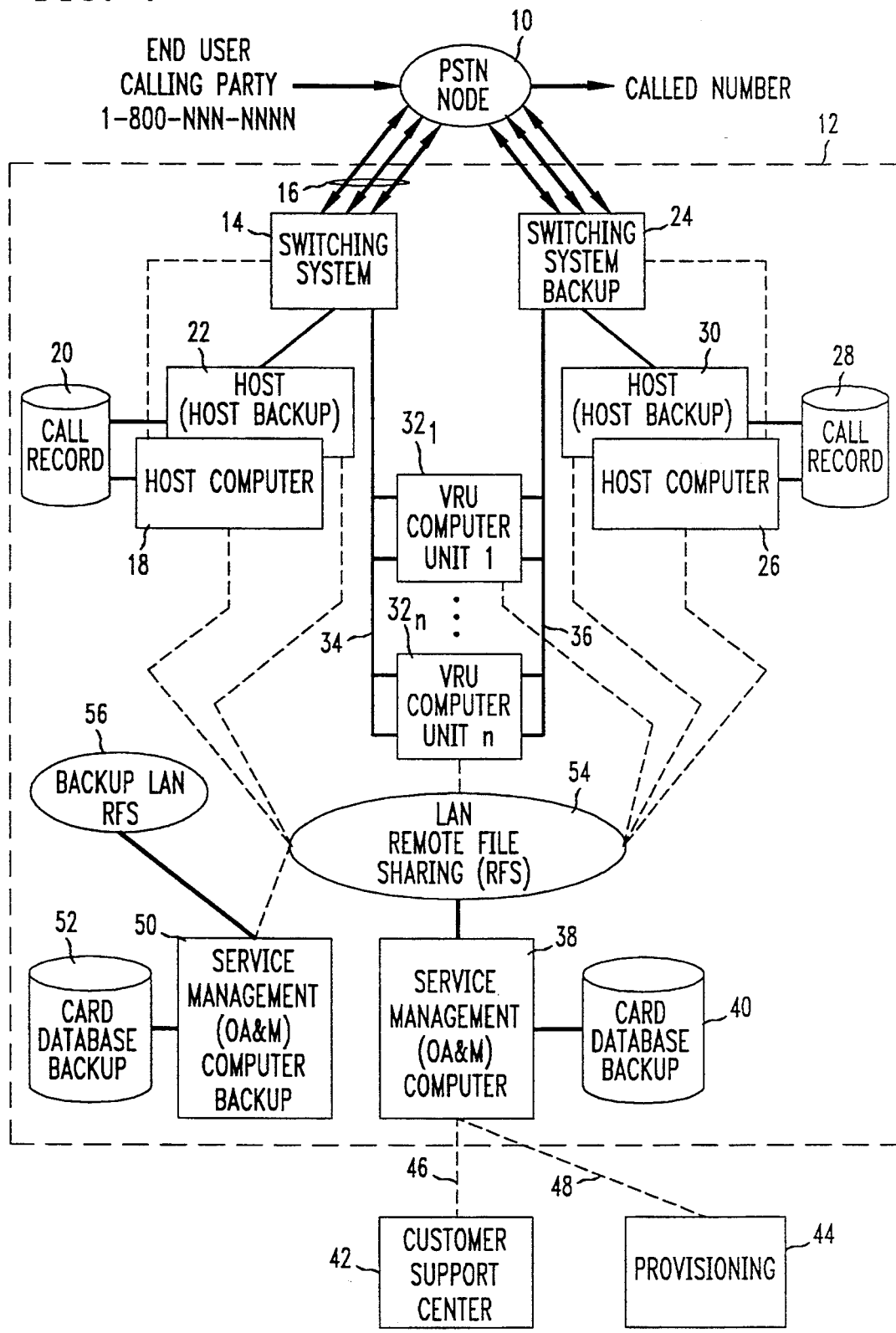
FIG. 1 illustrates a telephone network in accordance with this invention which provides multilingual prepaid telephone service.

In the example of the invention described here, a disposable prepaid card may be purchased from a telecommunications services provider. The card represents a predetermined number of calling units on the network of the services provider. Although such a prepaid card would be of use to anyone in need of telecommunications services, it would be particularly advantageous for foreign travelers, such as foreign tourists in the United States. The card may be obtained directly from the telecommunications services provider or may be obtained from an intermediary such as a travel agent or hotel which has purchased the card from the telecommunications services provider. The card holder will be able to use the card as a payment vehicle to make any kind of telephone call handled by the services provider, such as interlata, intralata, and international telephone calls.

To access a telecommunication system in accordance with this invention, a card holder dials a specific toll free number, such as an 800 number, to communicate with the system in his or her language of choice. The card may identify one or more of the possible 800 numbers along with the language associated with the 800 numbers. In one example of the invention, a different card may be sold for each of the languages supported by the system. In this example, only the 800 number for the language of each card needs to be printed on the card. Instructions about how to use the card may be given in that language on the card. The system may support any of a plurality of desired languages such as English, Spanish, French, Japanese, German, Italian, Swedish, Dutch, Korean, Chinese, and other languages. The system will prompt the card holder in the selected language to enter a card number and a destination number. The card number is verified, the available balance is determined, and the desired call is completed, if there is a sufficient credit balance. If there is an insufficient credit balance, an appropriate announcement is played in the selected language and the caller is disconnected.

The system decrements the balance associated with the card while the call is in progress and keeps track of the call duration that the customer is allowed for the call which is being made. If the customer's balance depletes before the end of the call, an announcement is played in the selected language and the customer is disconnected. If the card still has an available credit balance when the call is finished, the customer is informed in the chosen language of the remaining available balance and the customer is disconnected.

In addition to communicating with the customer in a selected one of a plurality of languages in the course of setting up a desired call and terminating that call, the system provides convenient access to a number of special services which are also rendered in the selected language. For example, access to weather information and news reported in the chosen language may be provided. Access to a translation service may also be provided in accordance with the invention. In situations where the caller has obtained a prepaid calling card from a re-seller of such cards, for example, from a hotel or travel agent, the system may provide a mechanism for obtaining information put out by that reseller such as advertising and the like.

In addition, the system supports a number of antifraud related capabilities including screening of the station from which the caller originates the phone call, for example, automated number identification (ANI) screening, and other fraud detection mechanisms.

FIG. 1 shows an example of a circuit architecture which constitutes an example of a multilingual prepaid calling system in accordance with this invention. This system permits a calling party to make a telephone call to a called number without the need for having an established business relationship with a telecommunications service provider involving post payment for telephone calls and without the need for the caller to have a large amount of currency or a particular credit card which would permit currently available pay phones to be used. The calling party is connected to the called number through one or more nodes in a public switched telephone network (PSTN). One of those PSTN nodes 10 is shown in FIG. 1. The node 10 may comprise a telecommunications switching system located in a central office. The switching system may be a switching system located in a network provided by a local exchange carrier (LEC) such as one of the Regional Bell Operating Companies. The switching system in this case may be, for example, an AT&T 5ESS ® switching system. Alternatively, the switching system may be a switching system located in the network of a long distance carrier such as AT&T. The switching system in this case may be, for example, an AT&T 4ESS ™ switching system. There usually are a plurality of such nodes 10 in a typical public switched telephone network.

In addition to the network node 10, the architecture of FIG. 1 also includes a platform or adjunct 12 connected to the network node 10. The platform may be co-located with the network node 10 or remotely located with respect to the node 10. The platform effectuates the multilingual prepaid calling service of the invention in conjunction with the usual equipment contained in the rest of the public switched telephone network. The platform 12 contains an end office digital switching system 14 connected to the network node 10 via one or more central office trunk facilities collectively designated by reference numeral 16. For example, the switching system 14 may be connected to the central office switching system in node 10 via one or more conventional T1 trunks, ISDN channels, or analog lines, as needed. The switching system 14 performs call processing functions for telephone calls between the platform 12 and the network node 10. The call processing functions of the switching system 14 are controlled by a host computer 18 operating in conjunction with a call record data base 20. A back up host computer 22 serves a redundant system for the host computer 18. The switching system 14 may be a Summa Four SDS-1000 distributed digital switching system and the host computers 18 and 22 may be AT&T 6486 computers using the UNIX ® System V, Release 3.2.3, operating system. The computers 18 and 22 may be connected to the switching system 18 by RS-232 asynchronous 9.6 Kbps data links using the Summa Four ADLC protocol.

A second switching system 24 similar to the switching system 14 is connected to the network node 10 in a fashion similar to the way switching system 14 is connected to the network node 10. The switching system 24 is controlled by a host computer 26 operating in conjunction with a call record data base 28 and backed up by another host computer 30. The switching system 24, host computers 26 and 30, and call record data base 28 may share the load imposed on the switching system 14 and its associated components. The switching system 24, host computers 26 and 30, and call record database 28 may also provide a back up capability for the switching system 14 and its associated components in the event of failure.

The multilingual prepaid services platform 12 also contains one or more voice response unit (VRU) computers $32_1 \ldots 32_n$ which perform voice response functions related to call setup and call takedown. These VRU computers $32_1 \ldots 32_n$ communicate with the caller in his or her language of choice to assist the caller in reaching a desired party. They are connected to the switching systems 14 and 24 through appropriate communications lines 34 and 36, respectively, which may be tip and ring lines connecting appropriate ports on the computers $32_1 \ldots 32_n$ to the switching systems 14 and 24. The VRU computers may be AT&T 6386 StarStation computers containing AT&T Voice Power IV (VP4) cards and appropriate software. The computers each may have a plurality of tip ring line ports capable of playing back 64K mu-law voice data to the caller through the switching systems 14 and 24 in the platform 12 and through the rest of the public switched telephone network between the caller and the platform 12. The computers $32_1 \ldots 32_n$ may also contain circuits which detect ringing on the lines connecting the computers $32_1 \ldots 32_n$ to the switching systems 14 and 24 in FIG. 1. The computers $32_1 \ldots 32_n$ also contain circuits for detecting on-hook and off-hook conditions on those lines, for example, a circuit operating in accordance with port loop current detection techniques. Each of the channels from the voice recognition unit computers $32_1 \ldots 32_n$ may terminate at a subscriber line interface card in the switching systems 14 and 24.

The architecture of FIG. 1 also contains a service management computer 38 which manages a card database 40 containing relevant information about each outstanding card such as the current balance for each card. In addition to managing the card data base 40, the service management computer 38 also performs operations, administration, and maintenance (OA&M) operations for the platform 12. The service management computer 38 also provides a gateway for remote access to the prepaid services platform 12. For example, there may be a customer support center 42 which is capable of reading the information contained in the platform 12 and a provisioning system 44 which is able to read the information already in the platform as well as write other information into the platform, such as updates to the information stored in the card database 40 and entry of new software into the platform 12. The customer support center 42 and provisioning system 44 may be in a remote location with respect to the platform 12 and may be connected to the service management computer 38 by means of 9600 baud modem connections 46 and 48, respectively. A second service management computer 50 and a second card database 52 may be provided in the architecture of FIG. 1 to provide a backup capability for the service management computer 38 and card database 40. The two computers 38 and 50 may be AT&T 6486 StarServers which serve as the primary and redundant administration machines, respectively.

The computers shown in FIG. 1 communicate with one another over a local area network 54 which may be an AT&T StarLAN 10 (Release 3.3) which performs a remote file sharing (RFS) function involving data sharing among the computers in FIG. 1. A backup local area network 56 is also provided in the architecture of FIG. 1.

The following description of a call flow represents the caller's interaction with the prepaid services platform 12. The caller is prompted to enter certain information into the platform and is given certain informational announcements. Communication from the platform is in a language selected by the caller from a plurality of different languages supported by the multilingual prepaid calling system.

The caller first dials a predetermined toll-free number, such as 1-800-LANGUAGE, to gain access to the prepaid platform 12. LANGUAGE is a unique number for each language supported by the system, for example, 1-800-SPANISH for a situation where the caller desires to be prompted in the Spanish language. If the prepaid calling system determines that prepaid calls are not allowed from the originating station used by the caller, an appropriate deny service announcement is played to the caller in the selected language and the caller is disconnected. Otherwise, the caller hears a welcome announcement and is prompted to enter a number which is printed on a prepaid calling card, or in an alternative embodiment, a number which appears on a card plus a personal identification number which is not on the card. The prepaid services platform then performs pre-validation checks on the card number. If the card fails these checks, the caller is prompted in the selected language to re-enter the card number or a card number plus PIN, as appropriate. The caller is allowed a predetermined number of attempts to enter a correct number, for example, three attempts. If the card fails validation or if there is insufficient credit associated with a valid card, then an appropriate announcement is played in the selected language indicating the reason for denial of service.

If a valid card number and PIN (if applicable) have been entered, the caller is informed of the available call balance in units associated with the card. In one example of the invention, the caller first may be prompted in the language of choice to enter a speed dialing alias. The speed dialing alias causes the caller to be automatically connected to an information source operating in the language of choice as determined by the original entry of a toll-free 800 number associated with that language. The caller next may be prompted in the language of choice to enter a destination telephone number by entering a "1" to place a call within the U.S. or by entering an appropriate country code to place an international call. The prepaid system performs editing checks on the alias or destination number. If the edit checks fail, the customer is prompted to re-enter the alias or destination number. The caller is allowed a predetermined number of attempts, for example, two attempts to enter a valid alias or destination. The caller is disconnected after entry of a predetermined number of invalid aliases or destination numbers.

If the edit checks are successful and there is sufficient credit available for the caller's card, then an announcement is played in the language of choice indicating that the call is being processed. If there is insufficient credit to complete the desired call, an announcement is played informing the caller that the available balance is insufficient to complete the call and the caller is disconnected. Once the call is set up, one or more of the following events can occur. A predetermined time, for example, one minute, prior to depletion of the call balance, a disconnect warning announcement may be directed to the caller and the call allowed to continue. Upon depletion of the call balance, a disconnect announcement may be played and the caller may be disconnected. In the alternative, the caller may be permitted to use another card with an undepleted call balance to continue the call after depletion of the call balance on a prior card. If the called party hangs up prior to depletion of the call balance, the caller is informed of the remaining available call balance and the call is disconnected. Alternatively, if there is a sufficient call balance, the caller may be prompted again in the chosen language to enter a speed dialing alias or a destination number.

The following is a more detailed technically oriented call flow more specifically descriptive of the operation of the circuitry of FIG. 1. As described above, a caller dials an 800 number to access the multilingual prepaid calling platform 12. There is an individual 800 number for each language supported by the platform 12. The switching system 14 and host computer 18 receive a call set up message over the trunks connecting the network node 10 to the switching system 14. The host computer 18 obtains the automatic number identification (ANI) of the station from which the call originates, if it is available, for example, from the D channel of an ISDN line. The host computer also receives the 800 number dialed by the caller and identifies the desired language in light of the identity of the 800 number. The host computer 18 may perform ANI screening by inspecting an ANI fraud table identifying certain stations from which calls will be denied, for example, because it has been determined that commission of fraud is particularly prevalent from the stations identified in the anti-fraud table. The host computer 18 then locates an available port in one of the VRU computers $32_1 \ldots 32_n$ and directs the switching system 14 to route the call to that available port. The host computer 18 also simultaneously sends an appropriate message to the selected VRU computer to inform that computer to process that call.

If the call fails ANI screening, the VRU computer plays an ANI fraud service deny announcement in the selected language and disconnects the caller. If the call passes ANI screening, the VRU computer plays a welcome announcement and prompts the caller to enter a card number, or a card number plus PIN in appropriate circumstances. The VRU computer collects the numbers entered by the caller and performs pre-validation processing. If the card fails pre-validation checks, the VRU computer prompts the caller to re-enter the card number. In one example of the invention, the caller is allowed three attempts to enter a valid card number including the initial attempt. After three unsuccessful attempts, an unrecognized card format announcement is played in the chosen language and the caller is disconnected. If analysis of the entered digits indicates that a card number plus PIN is needed, then the VRU computer prompts the caller to enter the PIN in addition to the card number.

If the card passes all pre-validation checks including PIN related checks, the VRU computer sends a query to the service management computer 38 and card database 40 for information about that particular card number. The database 40 receives the query and uses the card number to locate a set of card records associated with that number. The service management computer 38 retrieves the card record from the card database 40 and sends the card record to the appropriate VRU computer for validation. If there is no card record for the number involved in the query, then the service management computer 40 returns an invalid card number response to the VRU computer, which then plays an appropriate announcement to the user in the chosen language.

The VRU computer receives the response containing the card record and performs a series of card validation actions. The VRU computer first checks the expiration date of the card against a time clock maintained in the platform 12. If the card has expired, the VRU computer plays an expired card number announcement in the chosen language and disconnects the call. The VRU computer also inspects a fraud indicator or flag in the card record. If the fraud indicator is set to a deny state, the VRU computer plays a fraud deny announcement in the chosen language and disconnects the caller. The VRU computer similarly checks to see if a call-in-progress flag is set. If the flag is set, indicating that someone is already making a call with the card number, the VRU computer plays a call-in-progress announcement in the selected language and disconnects the caller. The VRU computer performs one final card validation action involving card number/PIN verification. If this verification fails, the VRU computer plays an invalid card number/PIN announcement in the chosen language and reprompts the caller to again enter the entire card number. The VRU computer disconnects the caller if the retry threshold described above is exceeded. When the card numbers and PIN's are used, the prepaid calling system may keep track of the number of invalid PIN's which are entered for each card number. When the number of invalid PIN's entered for a particular card number exceeds a predetermined threshold in a preselected time period, then the system may deny all call attempts on that card number for a predetermined period of time or permanently.

If the card passes the validation checks described above, the VRU computer performs credit balance processing. Specifically, the VRU computer compares the available balance found in the card report against some minimum credit threshold. If the card's available balance is less than the minimum credit threshold, the VRU computer plays an insufficient funds announcement in the chosen language and the caller is disconnected. If the card's available balance is greater than or equal to the minimum credit threshold, the VRU computer retrieves the card's available balance and forwards it to the host computer 18 for performing a rate determination operation. The VRU computer plays an announcement in the chosen language informing the caller of the available balance in units, such as available message units. If the user has entered a speed dialing alias, the destination number associated with the alias is retrieved from a location in memory. The VRU computer sets a call-in-progress flag to disallow simultaneous calls on the same card.

The VRU computer prompts the caller in the chosen language to enter a "1" to place a call within the North American Dialing Plan (NADP), namely, within the U.S., Canada, and some areas in the Caribbean region, or to enter the country code of a desired destination when the caller wishes to place an international call. If a country code is entered, the VRU computer checks the validity of the country code and retrieves a call rate associated with that country code stored in a call rate table located in the platform 12. If the country code check indicates that an invalid country code has been entered by the caller, the VRU computer prompts the customer in the chosen language to enter another number. If there are more than a predetermined number of unsuccessful attempts to enter a valid country code, an appropriate announcement is played in the chosen language and the caller is disconnected. If the entered country code passes the country code check, the caller is prompted to enter the local number in the destination country.

If a "1" is entered at the prompt, the caller next is prompted to enter the area code and number of the destination in the NADP. The VRU computer then checks the validity of the area code and exchange (NPA-NXX) and retrieves the appropriate call rate associated with the dialed destination number from the call rate table described above. If the area code and exchange check indicates an invalid NPA-NXX, the VRU computer prompts the customer to enter a new destination number. After a predetermined number of unsuccessful attempts to enter a valid NPA-NXX, for example, two unsuccessful attempts, an appropriate announcement is played in the chosen language and the caller is disconnected.

If a speed dialing alias is entered, the VRU computer translates the alias into a valid destination number as described in more detail in connection with the description of FIG. 2. If an invalid speed dialing alias has been entered, the caller is prompted to enter a new destination number. After a predetermined number of unsuccessful attempts, such as two unsuccessful attempts, an appropriate announcement is played and the caller is disconnected. If a valid destination number or a valid speed dialing alias has been entered, the VRU computer compares the available card balance against the balance required to make a one minute phone call to the desired destination. If the available call balance is greater than or equal to the balance required to make that one minute call, the VRU computer plays an announcement in the chosen language which informs the caller that the call is being processed. The switching system 14 is directed to outpulse the digits of the destination number to the network node 10. If the available call balance is equal to the balance required to make a one minute call, the VRU computer plays an announcement in the chosen language informing the caller that there is exactly one minute of available call time and that the call will be disconnected in one minute. The VRU computer then outpulses the destination number digits to the network node 10. If the available call balance is less than the balance needed to make a one minute call, the VRU computer plays an appropriate announcement in the chosen language informing the caller that the available balance is insufficient to complete the call and the call is disconnected. The VRU computer uses the stored call rate associated with the caller's destination number or alias and the available credit balance to determine the available call duration.

When the host computer 18 detects an off-hook from the called party, the host computer 18 starts an available call duration timer which was set in response to the determination of the available call duration. The call balance depletes while the call is in progress. If the host computer 18 detects that the available call balance is close to depletion, for example, the available call balance indicates that there is only one minute of calling time left, the host computer 18 and switching system 14 bridges a VRU computer onto the call. That VRU computer then is instructed to play a disconnect warning announcement in the chosen language which may be heard by both the calling party and called party. Once the available balance is depleted, the host computer 18 and the switching system 14 bridges one of the VRU computers onto the call. That VRU computer then plays a disconnect announcement in the chosen language and the called party is disconnected. If the calling party does not hang up immediately, the VRU computer may inform the caller that there is no remaining available balance on the card he or she is using. The host computer 18 also sends a message to the service management computer 38 and card database 40 that the balance on the card has been depleted. As mentioned above, in one example of the invention, instead of being disconnected, the caller may be permitted to use an additional card with an undepleted call balance to continue the phone call when the call balance of a prior card runs out.

If the called party hangs up prior to depletion of the available balance, the following actions occur. If the host computer 18 detects an on-hook from the called party prior to depletion of the call balance, the host computer 18 calculates the remaining available balance in light of the condition of the call timer and compares this computed balance to the minimum credit threshold. The host computer 18 causes one of the available VRU computers to notify the caller in the chosen language whether or not the available balance remaining on the card exceeds the minimum credit threshold and then disconnects the calling party. If the available balance exceeds the minimum credit threshold, the caller is also notified of the magnitude of the available balance. The caller then may be disconnected or invited in the chosen language to make further calls, as described above. The host computer 18 sends an update message to the service management computer 38 and the card database 40 notifying them of the calculated remaining balance. When the computer 38 and database 40 receive this update message, the computer 38 overwrites the present balance in the card record with the calculated balance sent in the update message. The computer 38 also clears the call-in-progress flag to allow future calls.

Figure 2:
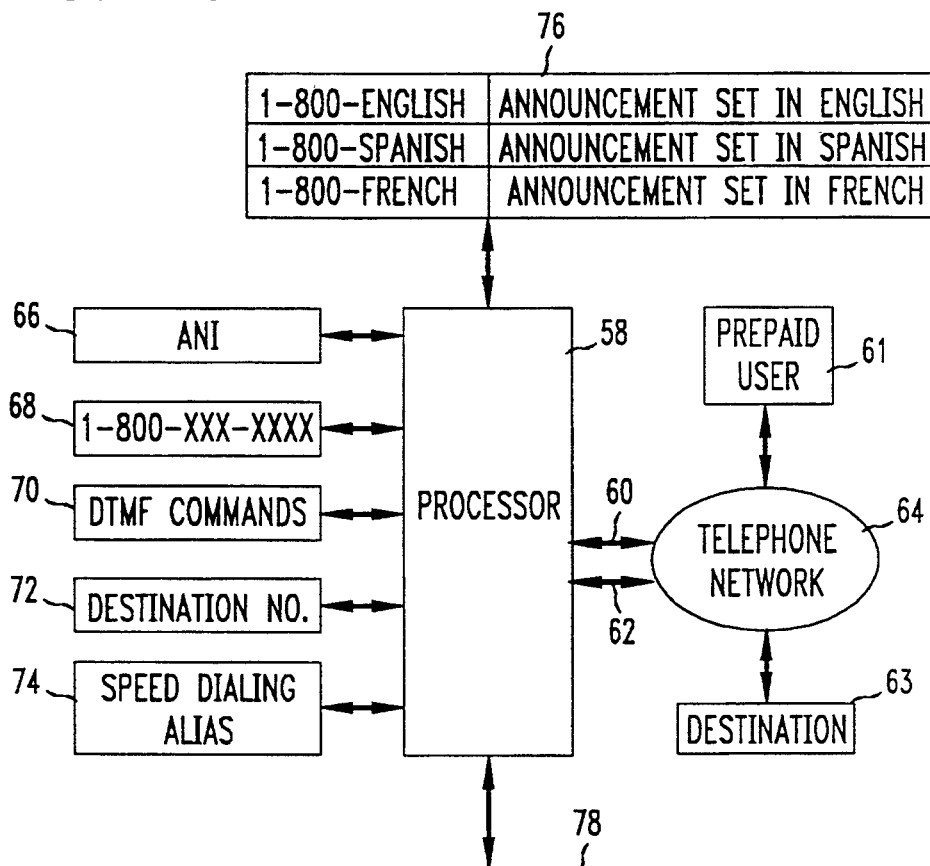
FIG. 2 illustrates pertinent details of one of the voice response units shown in FIG. 1.

FIG. 2 is a more detailed circuit diagram of one of the voice response unit computers $32_1 \ldots 32_n$ shown in FIG. 1. FIG. 2 illustrates in detail how the prepaid calling system effectuates multilingual capabilities. The VRU computer includes processor 58 which receives signals from a prepaid user 61 and sends signals to that prepaid user 61 on a line 60. The processor sends signals to a destination 63 and receives signals from that destination 63 on a line 62. Lines 60 and 62 are connected to the rest of the telephone network designated with a reference numeral 64. The rest of the telephone network 64 includes the switching systems 14 and 24, not shown in FIG. 2, and any other equipment in the network, such as node 10 used to establish a telephone connection between the user 61 and the destination 63.

The processor 58 receives a number of signals from the prepaid user 61 in the course of the call flow described above. These signals comprise representations of information from the user which are stored in one or more registers or other memory space in the VRU computer. The information received from the prepaid user 61 comprises the ANI which specifies the station from which the user 61 is calling. The ANI is stored in a memory element 66. The VRU computer also receives the 800 number dialed by the user 61 which is stored in a memory element 68. DTMF responses, such as the card numbers and PIN's, from the user, are stored in a memory element 70. A destination telephone number received from the user 61 in response to a prompt from the prepaid calling system is stored in a memory element 72. At a suitable time, as described in the call flow above, the switching system 14 or 24 is directed to outpulse the digits of the destination number stored in memory element 72 to connect the user 61 with the destination 63. Finally, any speed dialing alias entered by the user 61 is stored in a memory element 74. The speed dialing alias causes the VRU computer to retrieve a destination number from a memory, which is then outpulsed by the switching systems 14 or 24.

During the initial part of a call, the user 61 centers a particular 800 number to gain access to the platform 12. That 800 number is stored in memory element 68. The processor 58 is responsive to the nature of the 800 number in memory element 68 to cause announcements to the prepaid user 61 to be made on line 60 in a language chosen by the user 61 as signified by his or her selection of an 800 number. The processor 58 obtains the announcements from a memory element 76. Memory element 76 contains sets of announcements which will be used to communicate with the user 61. Each announcement may be a digital representation of a message to be sent to the user 61. Each set of announcements may be the same as the others except that each set is in a different language. There is one set of announcements for each of the 800 numbers by which the user can access the platform 12. The processor 58 retrieves and plays back on line 60 selected ones of the announcements in the announcement set specified by the 800 number dialed by the user 61 and stored in memory element 68.

In addition to prompting the user in a language selected by the user, the circuit of FIG. 2 also provides a number of special informational services to the user in his or her language of choice. These are easily obtained through entry of a speed dialing alias by the user 61 at the moment of an appropriate prompt from the service platform 12. In one example of the invention, the speed dialing alias may be one or more digits entered on a Touch Tone TM telephone prefaced by pressing a special key such as the asterisk (*) key found on those telephones. The nature of the speed dialing alias is stored in memory element 74. The processor 58 is responsive to the nature of the 800 number stored in memory element 68 and the nature of the speed dialing alias stored in memory element 74 to retrieve a routable destination number from a memory element 78 corresponding to the dialed 800 number and speed dialing alias. The destination number directed on line 62 to network 64 is outpulsed by one of the switching systems 14 or 24 to connect the user 61 with a destination 63 where the desired information service in the selected language is obtained. As shown in FIG. 2, the special services which may be obtained include, but are not limited to, a translation service, such as AT&T's Language Line service, home country or U.S. news, and weather information in any language supported by the platform 12, as directed by the user's selection of an 800 number and speed dialing alias. Other information services useful to a traveler or tourist may be obtained, for example, live operators speaking the language chosen by the user 61, travel information in that language, or currency exchange rates delivered in that language.

FIGS. 3 to 11 are flow charts showing in greater detail the operation and characteristics of the prepaid calling system shown in FIGS. 1 and 2, particularly showing a detailed example of an announcement set useful in carrying out this invention. Each of the numbered announcements printed in the flow charts of FIGS. 3 to 11 are one of the announcements in one of the announcement sets referred to above and selected by the user in light of the 800 number he or she dialed to gain access to the prepaid service platform 12. All of the announcements printed in the flow charts are in the English language to facilitate understanding of the invention. Those skilled in the art will appreciate that the actual announcements made to the user will be in the language he or she selected via the 800 number.

Figure 3:
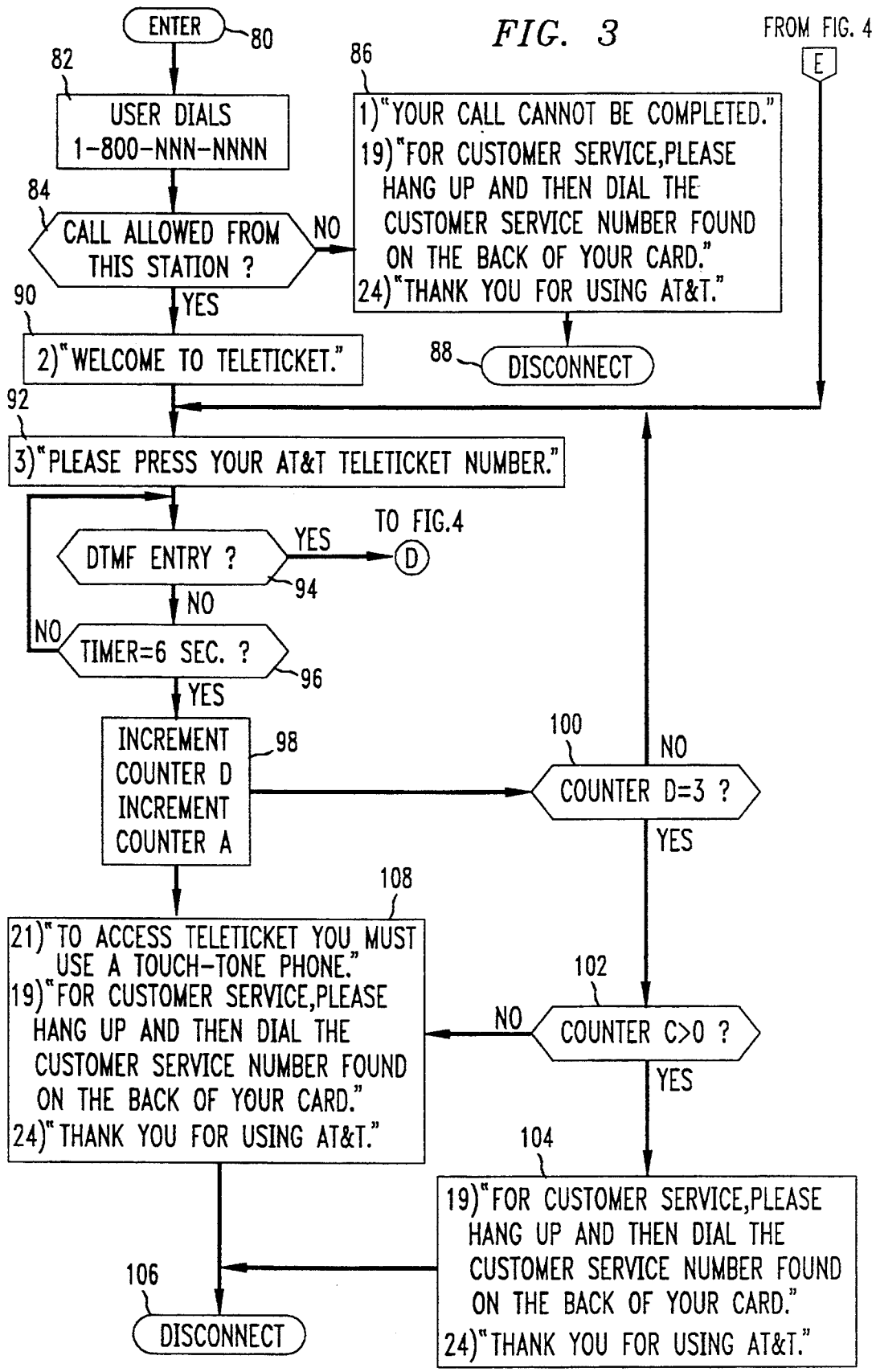
FIGS. 3-11 are flow charts representing the operation of the circuit of FIG. 1.

The flow chart of FIG. 3 begins at a start block 80. A prepaid user first dials a specific 800 number in block 82 which gains access to the prepaid calling platform 12 and identifies the language in which the user wishes to communicate with the platform 12 and in which the user may wish to receive special information. ANI screening is performed in block 84. If ANI screening indicates that calls are not to be taken from the station of the prepaid user, an announcement is relayed to the user in block 86 that the call cannot be completed from the phone he or she is using and that the user should call a customer service number. The caller is disconnected in block 88. If calls are allowed from the station being used by the prepaid user, as determined in block 84, then an announcement welcoming the user to the prepaid service is made in block 90 and an invitation is made to the user to enter his or her card number and if appropriate, a PIN number, in block 92. Entry of dual tone multiple frequency (DTMF) signals or other signals used to signify card number are detected in block 94. If no entry of such signals is detected for a predetermined period of time, such as six seconds, as determined in block 96, then a counter D and a counter A are incremented in block 98 and a check is made in block 100 to see if counter D has attained a value of three. If counter D has not attained a value of three, the operation of block 92 is repeated. If counter D has attained a value of three, then a check is made in block 102 to see if the value in a counter C is greater than zero. If the value in counter C is greater than zero, the user is instructed in block 104 to hang up and call customer service. The user is then disconnected in block 106. If the value of counter C is not greater than zero, as determined in block 102, then the user is told that he or she must use a Touch Tone TM telephone and it is suggested that he or she call customer service in block 108. Then the user is disconnected in block 106.

Figure 4:
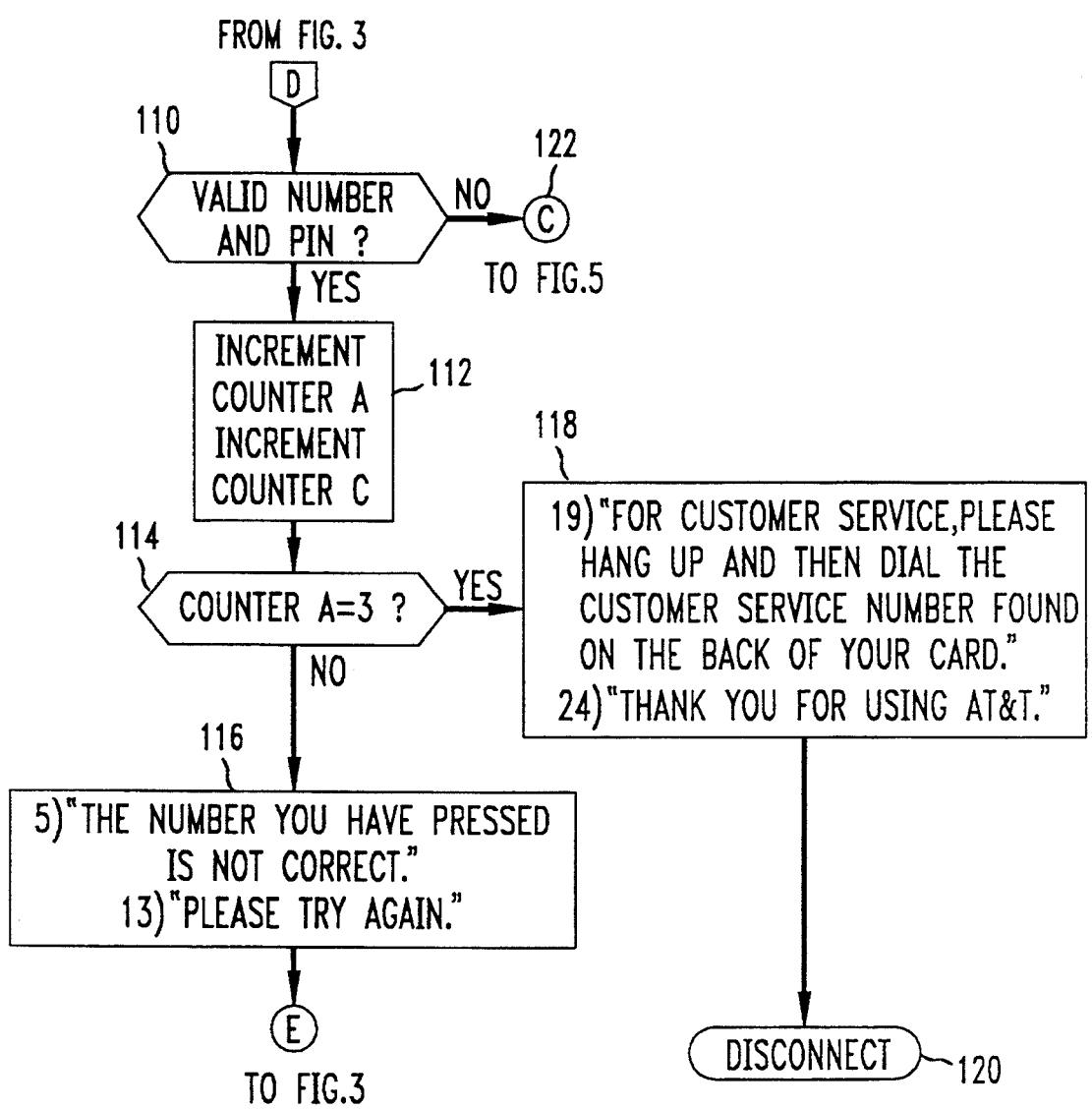

Once a complete card number and PIN, if necessary, have been entered as determined in block 94 in FIG. 3, a check is made in block 110 in FIG. 4 to see if the card number and PIN are valid. These validation checks may involve a determination of whether or not a check digit in the card number or PIN is consistent with the rest of the digits in the card number or PIN. These checks may also involve a determination of whether the card number and PIN are correctly associated with each other. If the entered numbers are invalid, a counter A and a counter C are incremented in block 112. A check then is made in block 114 to see if the state of counter A has attained a value of three. If the state of counter A has not attained a value of three, the user is informed in block 116 that the card number and PIN are not correct and the user is invited to try again. The operation of the circuit represented by the flow chart of FIG. 3 returns to the input of block 92 in these circumstances. If the state of counter A has attained a value of three, as determined in block 114, the user is instructed to hang up and call customer service in block 118 after which the user is disconnected in block 120.

Figure 5:
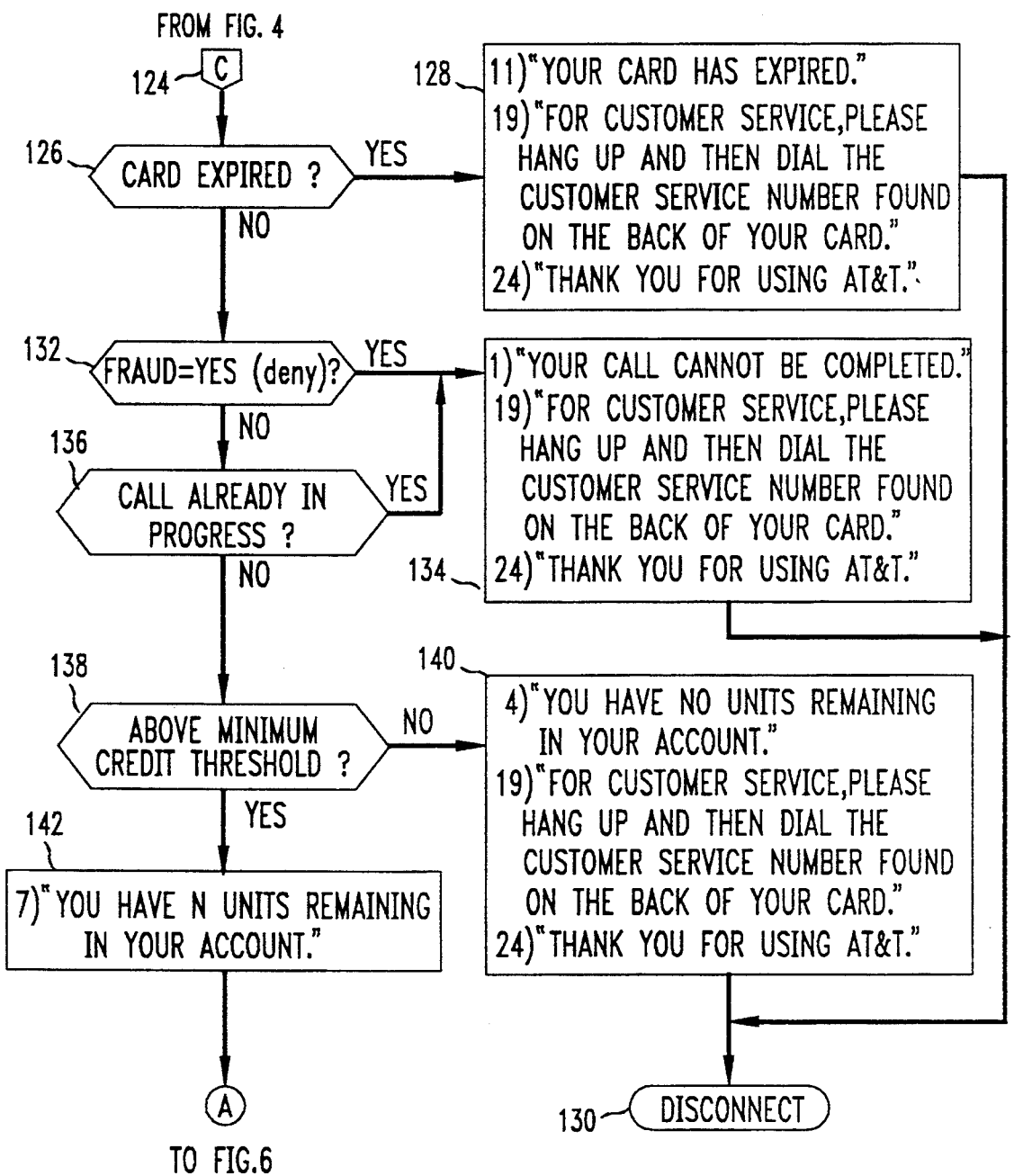

If a valid card number and PIN have been received, as determined in block 110 of FIG. 4, the operation of the circuit represented by the flow charts proceeds to the beginning of the flow chart of FIG. 5 as represented by block 122 in FIG. 4 and block 124 in FIG. 5. A determination next is made in block 126 to see if the card now under consideration has expired. If it is found in block 126 that the card has expired, a message to that effect is communicated to the user who is also invited to call customer service in block 128. The user is then disconnected in block 130. If the card has not expired, a determination is made in block 132 to see if a fraud flag has been set. If the fraud flag has been set, a message is sent to the user in block 134 that his or her call cannot be completed and the user is invited to call customer service. The user then is disconnected in block 130. If the fraud flag has not been set, then a check is made in block 136 to see if there is already a call in progress using the same card number and PIN. If that is the case, then the operation of block 134 is carried out and the user is disconnected in block 130. If there is no call in progress, a check is made in block 138 to see if the available credit balance is above some minimum credit threshold. If the credit balance is lower than the minimum, the user is so notified in block 140 and disconnected in block 130. If the credit balance is above the minimum, the user is notified of the amount of his or her credit balance in block 142.

Figure 6:
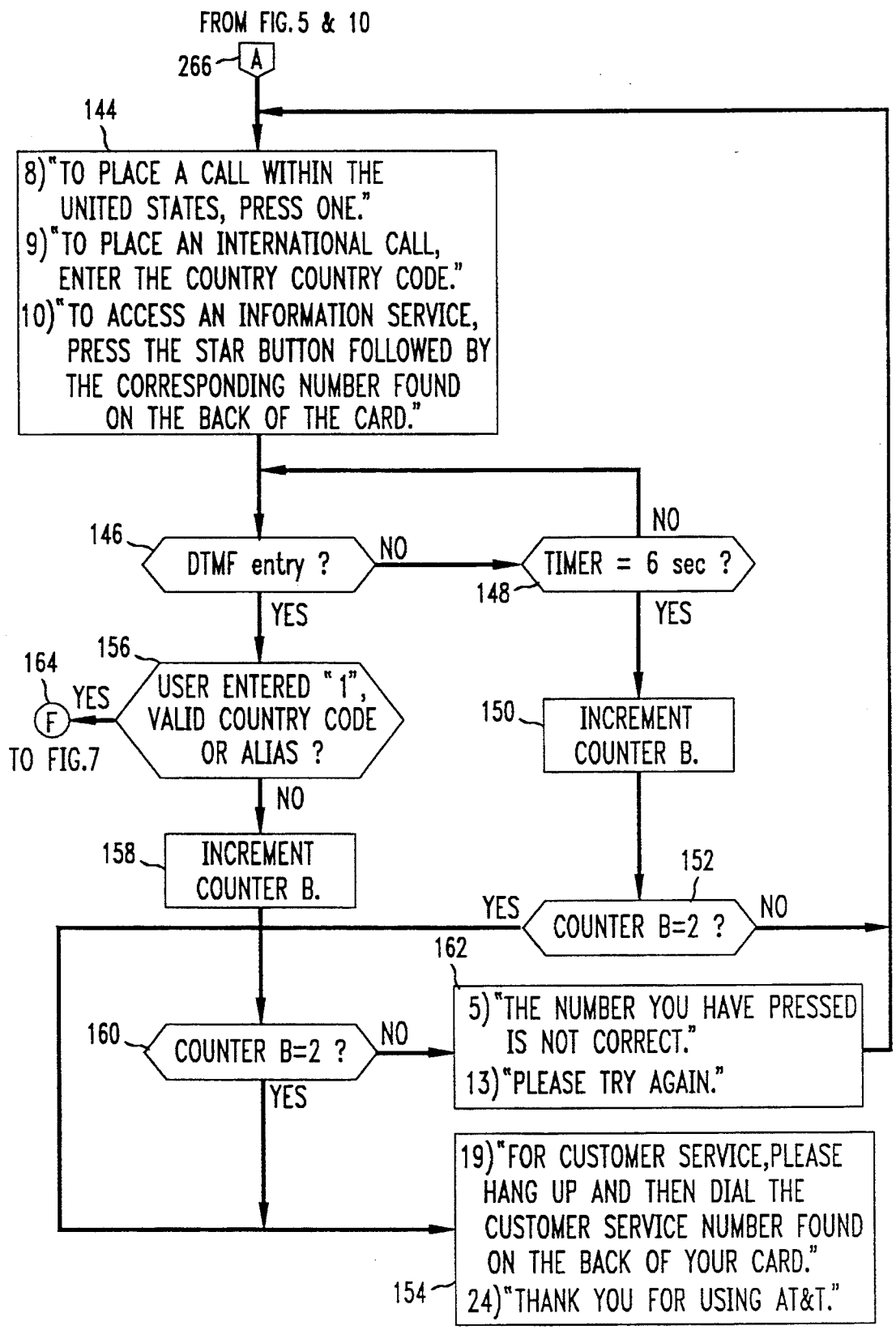

Once it has been found that the user has a credit balance above the minimum and the user has been notified of the amount of available credit, a message is sent to the user in block 144 of FIG. 6 regarding the procedure to be used for making domestic calls, international calls, and calls which access special information services. Receipt of DTMF entries is detected in block 146. If no DTMF entries are received within about six seconds as determined by a timer block 148, then a counter B is incremented in block 150. If the state of counter B has not attained a value of two, as determined in block 152, then the message of block 144 is repeated. If the state of counter B has attained a value of 2, then the user is told to hang up and contact customer service in block 154. If a DTMF entry has been received, as determined in block 146, then a determination is made in block 156 to see if the user has entered "1", a valid country code, or a valid speed dialing alias. If the determination made by block 156 is no, then counter B is incremented in block 158 and a determination is made in block 160 to see if the state of counter B has reached a value of two. If the state of counter B has not reached a value of two, a message is sent to the user in block 162 that the number he or she has entered is not correct and the message of block 144 is repeated. If the state of counter B has reached a value of two, as determined in block 160, then the message of block 154 is sent to the user.

Figure 7:
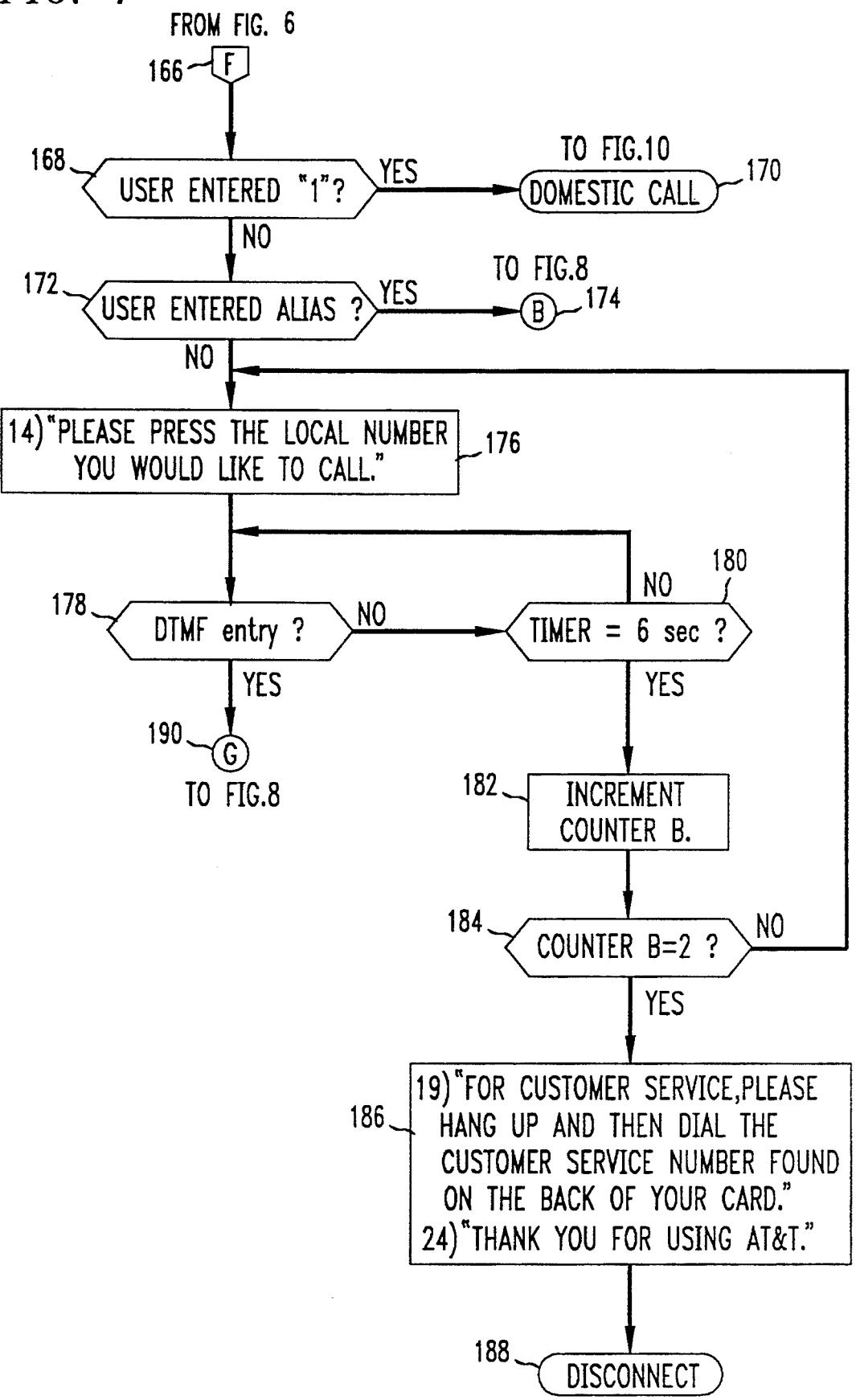

If the outcome of the determination made in block 156 is yes, the operation of the circuit represented by the flow charts of FIGS. 3 to 11 proceeds to the beginning of the flow chart shown in FIG. 7 as indicated by block 164 in FIG. 6 and block 166 in FIG. 7. A determination is made in block 168 as to whether the user entered "1". If the determination is yes, then the circuit recognizes that the user is attempting to make a domestic long distance telephone call and the operation of the circuit represented by the flow charts of FIGS. 3 to 11 proceeds to the flow chart of FIG. 10 as indicated in block 170. If the user has not entered "1" as determined in block 168, then a determination is made in block 172 as to whether the user entered a speed dialing alias. If the user entered a speed dialing alias, then the operation of the circuit proceeds to beginning point of the flow chart shown in FIG. 8, as indicated by block 174 in FIG. 7.

If the outcome of the determination made in block 172 is no, the circuitry recognizes that the user wishes to make a local call and a message is sent to the user in block 176 to dial the local phone number the user wishes to call. A block 178 detects entry of DTMF signals and a block 180 checks to see if those entries are made within certain time intervals. If entries are not made within six seconds, for example, counter B is incremented in block 182 and a check is made in block 184 to see if the state of counter B has reached a value of two. If the state of counter B has not yet reached a value of two, the announcement of block 176 is repeated again requesting entry of a desired local telephone number. If the state of counter B has reached a value of two, the user is requested to hang up and dial customer service in block 186 after which the user is disconnected in block 188.

Figure 8:
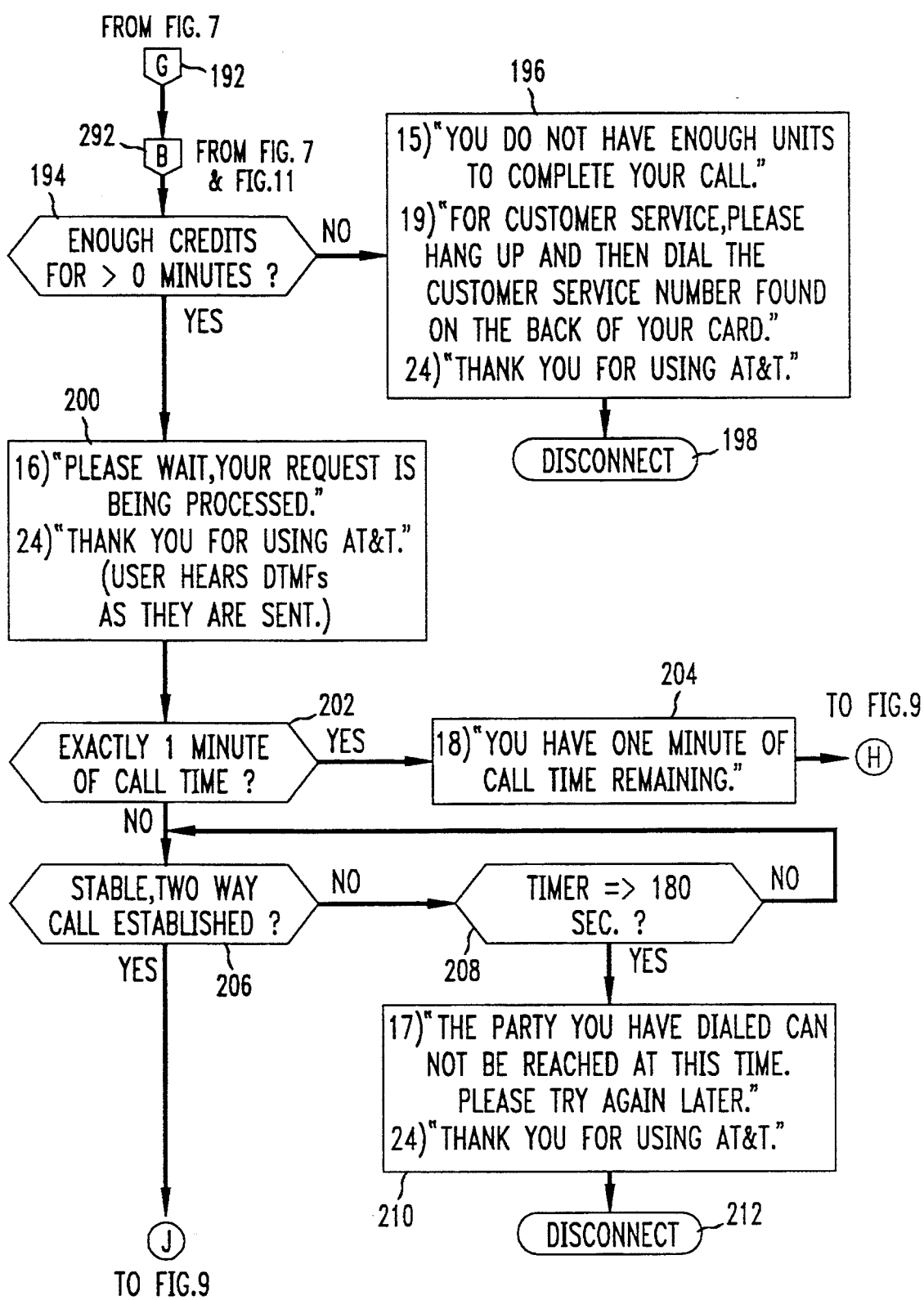

If DTMF entries have been properly received, as determined in block 178, then the operation of the circuit represented by the flow charts of FIGS. 3 to 11 proceeds to the beginning of the flow chart shown in FIG. 8 as indicated by block 190 in FIG. 7 and 192 in FIG. 8. A check is made in block 194 to see if the credit balance is sufficient to make the phone call requested by the user. If the credit balance is insufficient, a message to that effect is sent to the user in block 196, invitation is made to call customer service, and the user is disconnected in block 198. If there is enough credit to complete the phone call, a message notifying the user that the call is being completed is sent in block 200. Block 202 checks to see if the credit balance is exactly one minute of calling time for this call. If the credit balance represents exactly one minute of calling time, then the user is notified of such in block 204.

Block 206 determines whether or not a stable, two-way call has been established. If such stable call has not been established for a predetermined period of time, such as a time period greater than or equal to 180 seconds, as determined in block 208, then a message is sent to the user that the called party cannot be reached at this time and the call should be tried later as shown in block 210. The user is disconnected in block 212 after the message of block 210 is sent. If a call has been established, as determined in block 206, then a determination is made as to whether or not the available credit balance is sufficient for a call of greater than one minute in block 214 in FIG. 9. If there is enough credit for a phone call greater than one minute, then a determination is made in block 216 to see whether the calling party is on-hook. If the calling party is on-hook, then the user is disconnected in block 218. If the calling party is off-hook, a determination is made in block 220 to see whether or not the called party is on-hook. If the called party is off-hook, as determined in block 220, then the operation of block 214 and successive blocks is repeated. When the available credit balance is no longer such that a call of greater than one minute is permitted, as determined in block 214, then a message is sent to the user that only one minute of calling time remains as shown in block 222.

Figure 9:
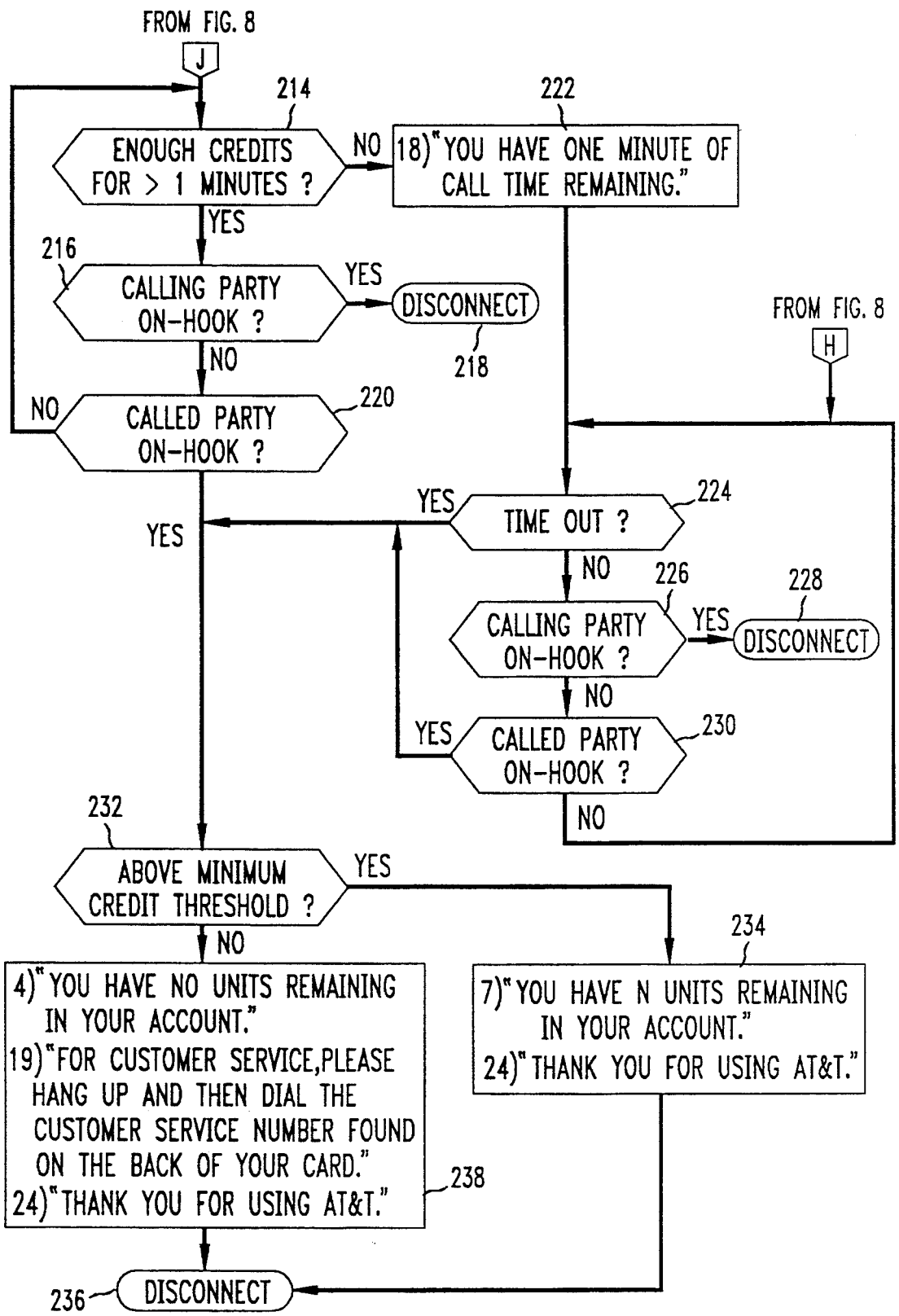

After the messages of blocks 204 in FIG. 8 and 222 in FIG. 9 notifying the user of one minute of calling time left have been sent, the call is allowed to continue and a determination is made in block 224 in FIG. 9 to see if the time has run out. If the time has not run out and tile calling party goes on-hook as determined in block 226, the user is disconnected in block 228. If the calling party remains off-hook and time has not run out as determined in block 224, then a determination is made to see if the called party goes on-hook in block 230. If the called party stays off-hook, then the operation of the circuit represented by the flow chart of FIG. 9 returns to the input of tile time out block 224 and repeats the operation of that block and successive blocks.

If the called party goes on-hook as determined in block 220, if the calling time has run out as determined in block 224, or if the called party goes on-hook as determined in block 230, then a determination is made in block 232 to see if the remaining credit is above some minimum threshold value. If the available credit balance is above the minimum threshold value, then a message is sent to the user notifying him or her of the available credit balance in block 234. The user is then disconnected in block 236. If the available credit balance is below the minimum credit threshold, then the user is notified in block 238 that there is no remaining credit on his or her card and the user is requested to call customer service after which the user is disconnected in block 236.

Figure 10:
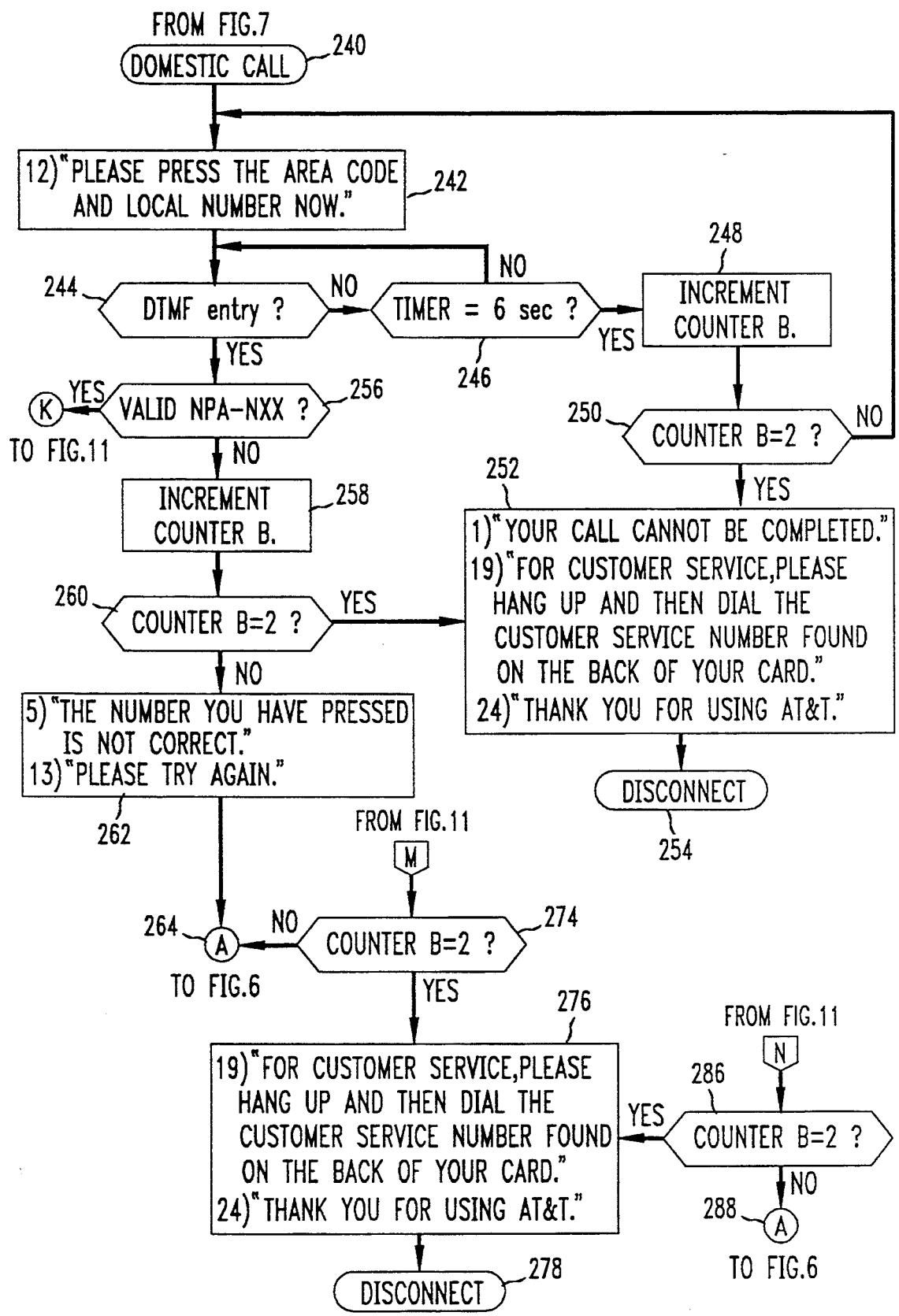

When it is determined in block 168 in FIG. 7 that the user wishes to make a domestic long distance call, the operation of the circuitry represented by the flow charts of FIGS. 3 to 11 proceeds from the yes output of block 168 in FIG. 7 to the beginning of the flow chart of FIG. 10, as shown by block 170 in FIG. 7 and block 240 in FIG. 10. When the operation of the circuitry has entered the beginning of the flow chart of FIG. 10 in block 240, the user then is prompted to enter the area code and local phone number in block 242. A DTMF entry is detected in block 244 and if no DTMF entry is detected for a predetermined time, for example, six seconds, as set by a timer block 246, then counter B is incremented in block 248 and a determination is made in block 250 whether the state of counter B has attained a value of two. If the state of counter B has not attained a value of two, then the message of block 242 is again sent to the user. If the state of counter B has attained a value of two, then the message of block 252 is sent to tile user to the effect that the call cannot be completed and it is suggested that the customer hang up and dial customer service. The user then is disconnected in block 254.

If DTMF entries are detected in block 244, edit checks are performed on the entered destination number, namely, a determination is made in block 256 as to whether a valid area code and exchange number have been entered. If a valid area code and exchange number have not been entered, then counter B is incremented in block 258 and a determination is made in block 260 as to whether the state of counter B has attained a value of two. If counter B has not reached a value of two, a message is sent to the user in block 262 that he or she has entered an incorrect number and the user is invited to try again. The operation of the circuitry represented by the flow charts then proceeds to the point in the flow chart of FIG. 6 as indicated in blocks 264 in FIG. 10 and in block 266 in FIG. 6. If the state of counter B has attained a value of two, as determined in block 260, the message of block 252 is sent to the user who is then disconnected in block 254.

Figure 11:
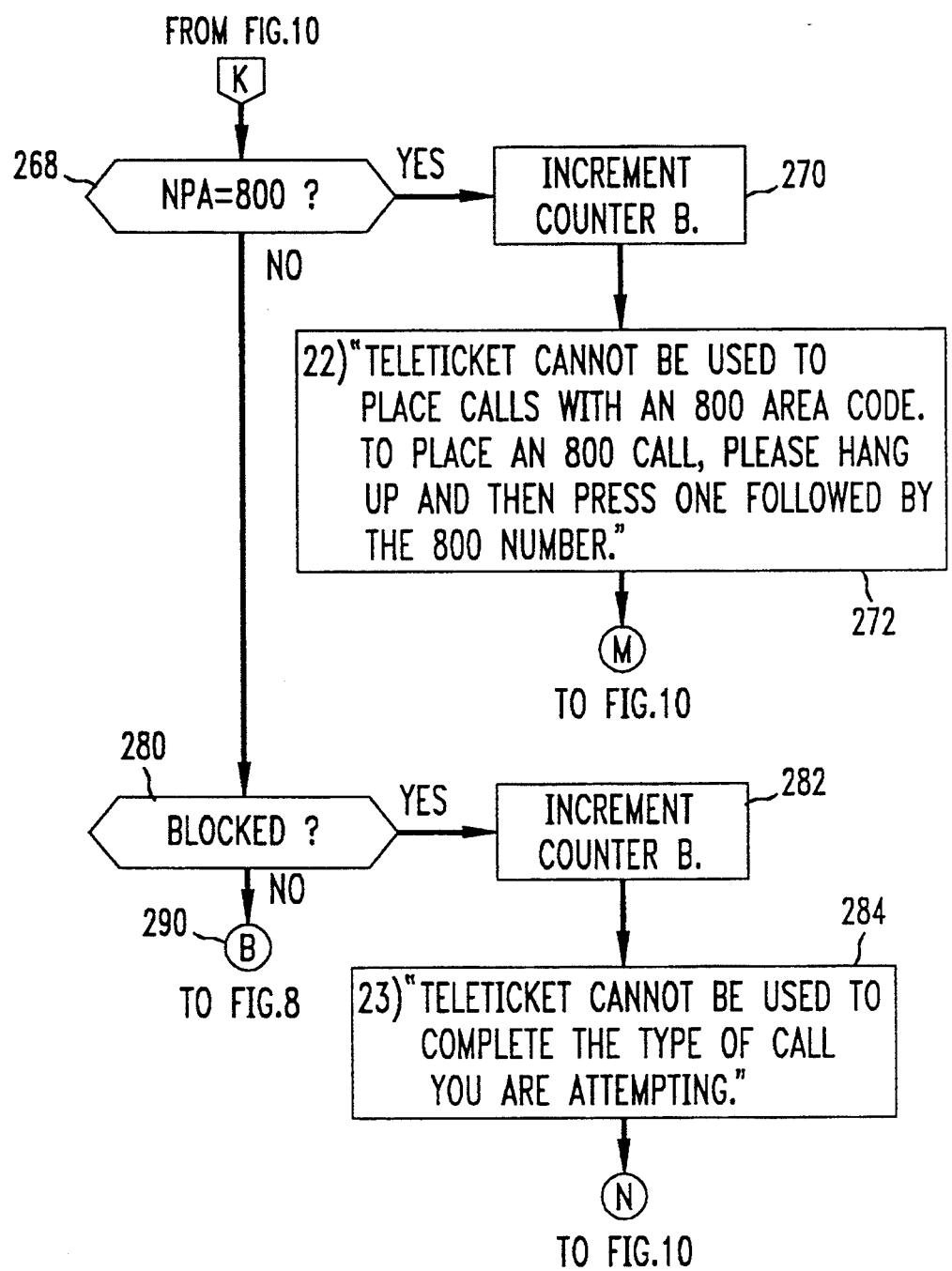

If the user has entered valid area code and exchange numbers, as determined in block 256 of FIG. 10, the circuit then checks to see if the area code equals 800 in block 268 of FIG. 11. If the entered area code is 800, counter B is incremented in block 270 and a message is sent to the user in block 272 that the prepaid service cannot be used to place 800 area code telephone calls. The user is requested to hang up and place the 800 call without using the prepaid service since 800 calls are toll free and do not need to use the prepaid service. After the message of block 272 in FIG. 11 is sent to the user, a check is made in block 274 in FIG. 10 to see whether the state of counter B has attained a value of two. If the state of counter B has not attained a value of two, then the operation of block 264 and successive blocks in FIG. 6 are performed. If the state of counter B has attained a value of two, a message is sent to the user in block 276 to hang up and seek assistance from customer service. The user then is disconnected in block 278.

If the area code dialed by the user is not 800, as determined in block 268 in FIG. 11, then a determination is made in block 280 to see if the attempted call is for some reason blocked and not permissible using this prepaid service. If this call is a blocked call, then counter B is incremented in block 282 and a message is sent to the user in block 284 that his or her attempted call is not permissible using the prepaid service. A determination is then made in block 286 in FIG. 10 as to whether the state of counter B has attained a value of two. If the state of counter B has not attained a value of two, then the operation of the circuitry proceeds to block 266 in FIG. 6 as represented by block 288 in FIG. 10. If the state of counter B has attained a value of two, then the message of block 276 is played to the user who is then disconnected in block 278. If the call attempted to be placed by the user is not a blocked call, as determined in block 280 in FIG. 11, then the operation of the circuitry proceeds to the beginning of the flow chart in FIG. 8 as represented by block 290 in FIG. 11 and 292 in FIG. 8.

Although this disclosure deals with an example of an architecture involving a separate hardware platform connected to a central office switching system, the scope of this invention also includes situations involving where a multilingual prepaid calling system is an integral part of such a switching system, namely, situations involving provisions of equivalent capability as one or more software modules or hardware additions to an existing computer and electronic circuitry in a central office switching system.

We claim:

1. A telecommunications apparatus, comprising:
   means for making announcements in a predetermined one of a plurality of languages in response to entry of a predetermined one of a plurality of telephone numbers; and
   means for calling a telephone number of a called party communicating in the one of a plurality of languages as a function of a speed dialing alias and the predetermined one of a plurality of telephone numbers.

2. The apparatus of claim 1, in which the announcements are instructions directed to a user regarding how to make a prepaid telephone call.

3. The apparatus of claim 1, in which the calling means comprises a means for translating the speed dialing alias into a routable telephone number.

4. The apparatus of claim 3, in which the calling means comprises a means for storing a routable telephone number for an entered telephone number and a speed dialing alias.

5. The apparatus of claim 4, in which the calling means further comprises means for outpulsing a predetermined one of the routable telephone numbers in response to entry of a speed dialing alias.

6. The apparatus of claim 1, in which the called party is a special information source which communicates in the predetermined one of a plurality of languages.

7. The apparatus of claim 6, in which the information source communicates weather information.

8. The apparatus of claim 6, in which the information source communicates news.

9. The apparatus of claim 6, in which the information source communicates language translations.

10. The apparatus of claim 6, in which the information source communicates currency exchange information.

11. A public switched telephone network, comprising:
    at least one central office switching system; and
    a multilingual prepaid services system associated with the central office switching system.

12. The apparatus of claim 11, in which the multilingual prepaid services system is connected to the at least one central office switching system by means of a T1 trunk.

13. The apparatus of claim 11, in which the multilingual prepaid services system is connected to the at least one central office switching system by means of at least one ISDN channel.

14. The apparatus of claim 11, in which the multilingual prepaid services system is connected to the at least one central office switching system by means of at least one analog line.

15. The apparatus of claim 11, in which the services system comprises an end office switching system trunked to the at least one central office switching system.

16. The apparatus of claim 15, in which the services system further comprises a host computer connected to and controlling the end office switching system.

17. The apparatus of claim 16, in which the services system comprises a backup computer for the host computer.

18. The apparatus of claim 15, in which the services system comprises another end office switching system which backs up the end office switching system.

19. The apparatus of claim 11, in which tile services system comprises at least one voice response unit computer capable of communicating with a user of the telephone network in a plurality of languages.

20. The apparatus of claim 12, in which the services system comprises at least one voice response unit computer connected by means of at least one tip and ring line to the end office switching system, the voice response unit computer capable of communicating with a user of the telephone network in a plurality of languages.

21. The apparatus of claim 19, in which the voice response unit computer contains stored representations of routable telephone numbers of information sources communicating in a plurality of languages.

22. The apparatus of claim 21, in which the voice response unit computer is capable of storing an access number entered by a prepaid user requesting communications in one of the plurality of languages and is capable of storing a speed dialing alias entered by the prepaid user, the voice response unit computer being responsive to the entered access number and the entered speed dialing alias for communicating with the prepaid user in the one of a plurality of languages and for outpulsing one of the routable telephone numbers of an information source which communicates in the one of the plurality of languages so that the prepaid user is connected with the information source associated with the outpulsed telephone number.

23. A multilingual prepaid telephone apparatus comprising:
    a means for receiving one of a plurality of telephone numbers from a prepaid user, each of the telephone numbers representing operation of the multilingual prepaid telephone apparatus in one of a plurality of languages;
    a means for storing a group of announcements in the plurality of languages;
    a means responsive to a received one of the plurality of telephone numbers for directing at least one of the group of announcements to the prepaid user in the language represented by the received telephone number;
    a means for receiving at least one signal from the prepaid user representing a user's account number in response to an announcement sent to the user in the language represented by the received telephone number;
    a means for verifying the validity of the account number;
    a means for determining if there is a predetermined amount of available credit associated with the account number;
    a means for receiving a destination telephone number from the prepaid user;
    a means for determining if there is sufficient credit available for a telephone call to the destination number for a predetermined minimum time;
    a means for determining an available duration of a telephone call to the destination number in light of the available credit and nature of the destination telephone number;
    a means for completing a telephone call from the prepaid user to the destination number if there is sufficient available credit for a telephone call to the destination number for the predetermined minimum time;
    a means for setting a timer with the available duration of a telephone call to the destination number;
    a means for starting the timer and running it during the telephone call to the destination number;
    a means for disconnecting the telephone call to the destination number when the timer runs out; and
    a means for computing a new available credit balance if the telephone call to the destination number ends prior to the timer running out.

24. The multilingual prepaid telephone apparatus of claim 23, further comprising
    a means for receiving a speed dialing alias and outpulsing a routable telephone number of an information source communicating in the one of a plurality of languages represented by the received telephone number when account number is valid and when there is the predetermined amount of credit.

25. The apparatus of claim 23, further comprising a means for performing edit checks on the destination telephone number from the prepaid user.

26. A method of providing a multilingual prepaid telephone service comprising the steps of:
    playing announcements to a prepaid user in one of a plurality of languages requested by the user regarding instructions about how to make a prepaid telephone call; and
    completing a requested telephone call from the prepaid user to a destination number requested by the user in response to prompts made by the announcements.

27. The method of claim 26, further comprising the step of calling a destination number of a party who communicates in the requested language in response to entry of a speed dialing alias by the prepaid user.

28. The method of claim 26, in which the one of a plurality of languages is selected in response to entry of a predetermined toll free telephone number by the prepaid user.

29. A method of providing a multilingual prepaid telephone service, comprising the steps of:
    receiving one of a plurality of telephone numbers from a prepaid user, each of the telephone numbers representing operation of a multilingual prepaid telephone apparatus in one of a plurality of languages;

storing a group of announcements in the plurality of languages;

directing at least one of the group of announcements to the prepaid user in the language represented by the received telephone number in response to a received one of the plurality of telephone numbers;

receiving at least one signal from the prepaid user representing a user's account number in response to an announcement sent to the user in the language represented by the received telephone number;

verifying the validity of the account number;

determining if there is a predetermined amount of available credit associated with the account number;

receiving a destination telephone number from the prepaid user;

determining if there is sufficient credit available for a telephone call to the destination number for a predetermined minimum time;

determining an available duration of a telephone call to the destination number in light of the available credit and nature of the destination telephone number;

completing a telephone call from the prepaid user to the destination number if there is sufficient available credit for a telephone call to the destination number for the predetermined minimum time;

setting a timer with the available duration of a telephone call to the destination number;

starting the timer and running it during the telephone call to the destination number;

disconnecting the telephone call to the destination number when the timer runs out; and computing a new available credit balance if the telephone call to the destination number ends prior to the timer running out.

30. The method of claim 29, further comprising the step of:

receiving a speed dialing alias and outpulsing a routable telephone number of an information source communicating in the one of a plurality of languages represented by the received telephone number when account number is valid and when there is the predetermined amount of credit.

31. Method of making a multilingual prepaid telephone call, comprising the steps of:

calling a predetermined one of a plurality of telephone numbers, each of the plurality of telephone numbers corresponding to a different one of a plurality of languages;

receiving one or more announcements in a preselected language corresponding to the predetermined telephone numbers, the one or more announcements comprising one or more instructions on how to make a prepaid telephone call; and making a prepaid telephone call in accordance with the one or more announcements.

32. The method of claim 31 in which the making step comprises the step of using a speed dialing alias to complete a prepaid telephone call to a party communicating in the preselected language.

33. Method of providing multilingual prepaid telephone service, comprising the steps of:

playing instructional announcements over a public switched telephone network to a prepaid telephone caller in one of a plurality of languages selected by the caller; and completing a prepaid call to a called party via a public switched telephone network in answer to responses of the caller to the instructional announcements.

34. The method of claim 33 in which the completing step comprises the step of completing a telephone call to a party communicating in the one of the plurality of languages.

* * * * *